Jan. 20, 1959  P. GINDES ET AL  2,870,422
ACCELEROMETER
Filed Feb. 25, 1957  4 Sheets-Sheet 1
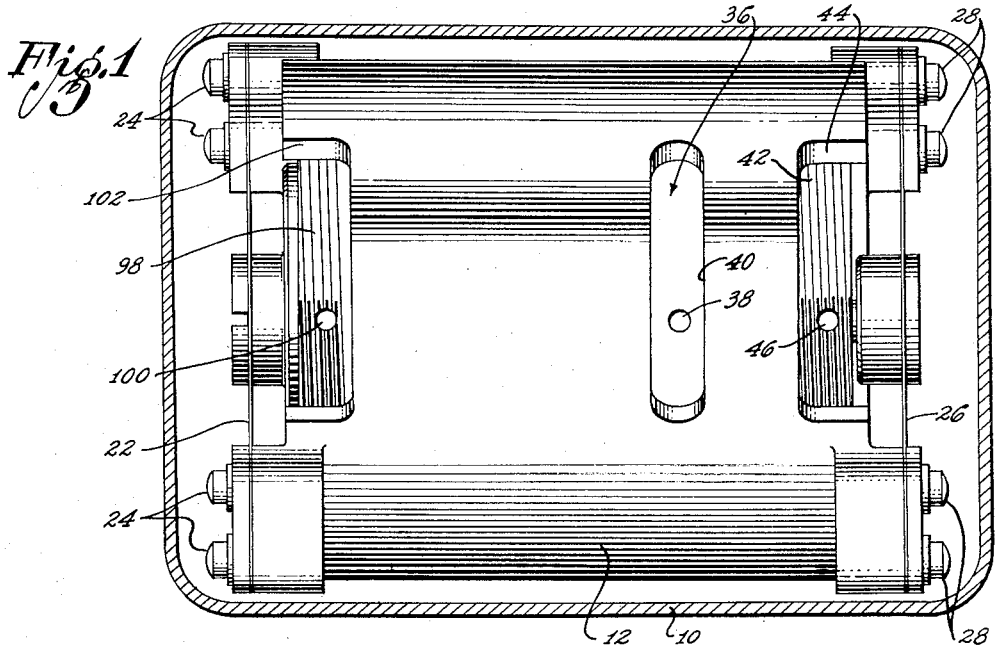
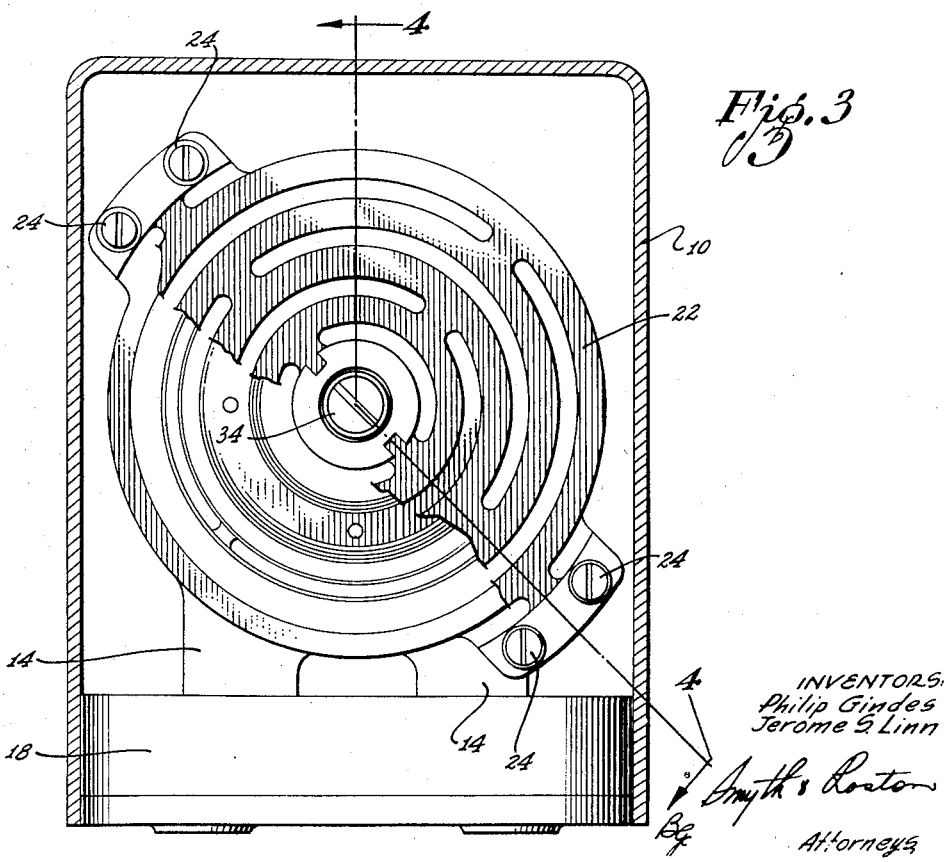
INVENTORS.
Philip Gindes
Jerome S. Linn
Attorneys Jan. 20, 1959 P. GINDES ET AL 2,870,422
ACCELEROMETER
Filed Feb. 25, 1957 4 Sheets-Sheet 2
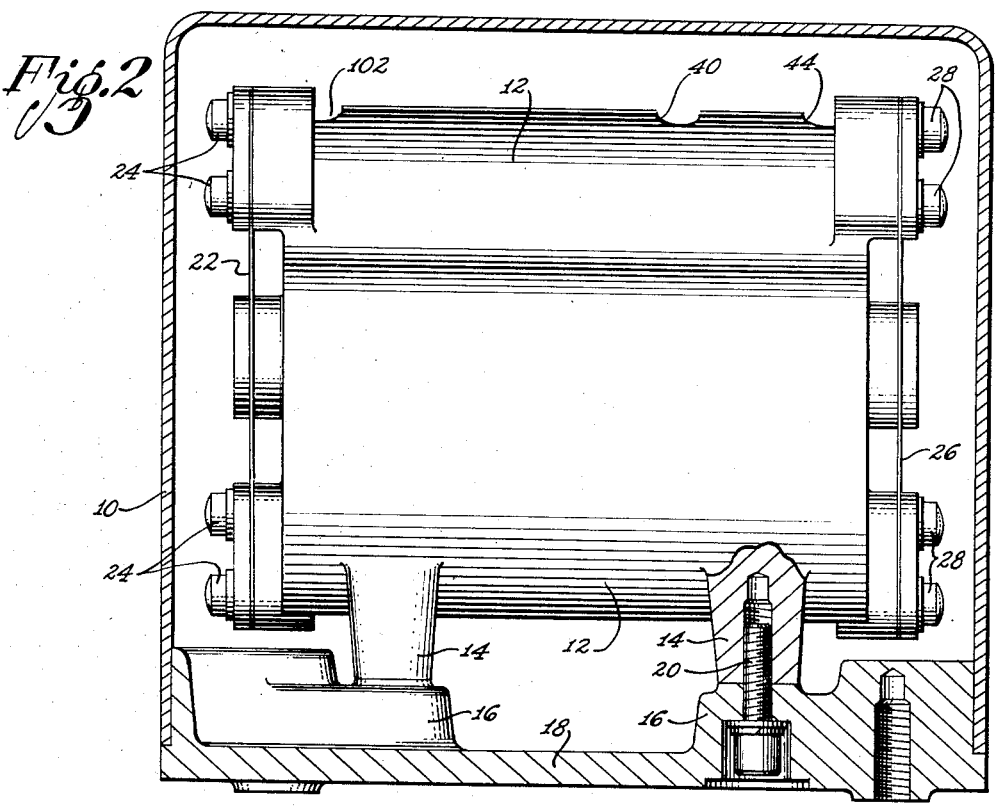
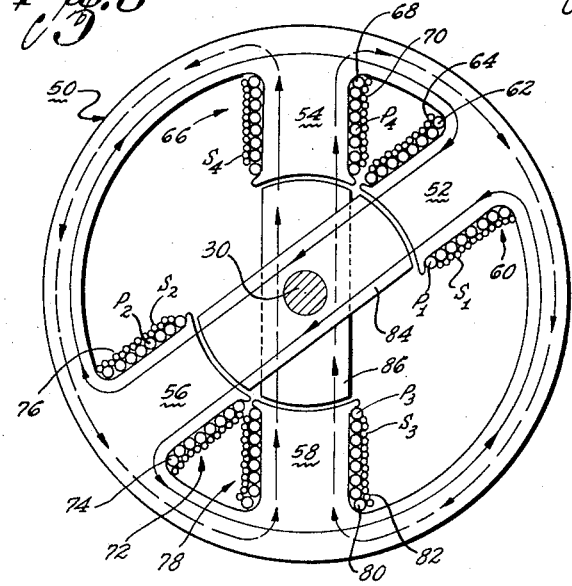
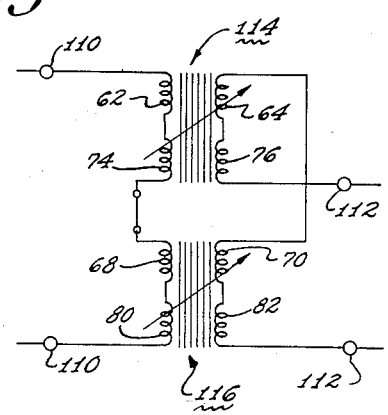
INVENTORS:-
Philip Gindes
Jerome S. Linn
By Smyth & Roston
Attorneys Jan. 20, 1959    P. GINDES ET AL    2,870,422
ACCELEROMETER Filed Feb. 25, 1957      4 Sheets-Sheet 3

INVENTORS:
Philip Gindes
Jerome S. Linn

By Smyth & Roston
Attorneys

Jan. 20, 1959  P. GINDES ET AL  2,870,422
ACCELEROMETER

Filed Feb. 25, 1957  4 Sheets-Sheet 4

INVENTORS:
Philip Gindes
Jerome G. Linn

By Smyth & Roston
Attorneys

United States Patent Office 2,870,422
Patented Jan. 20, 1959

2,870,422

ACCELEROMETER

Philip Gindes and Jerome S. Linn, Los Angeles, Calif., assignors to Genisco, Inc., Los Angeles, Calif., a corporation Application February 25, 1957, Serial No. 642,204

7 Claims. (Cl. 336—30)

The present invention relates to an improved instrument of the type referred to generally as "accelerometers"; which instruments are used for sensing and measuring accelerations of a moving body and for other purposes.

In the operation of aircraft, missiles, and the like, it is often necessary to provide accurate acceleration records. These records enable the performance characteristics of such units to be analyzed, and make it possible for important design data to be derived. It is apparent that accelerometers suitable for this purpose must be capable of accurate and reliable operation even in the presence of extremely high velocities and accelerations. Moreover, such accelerometers must be rugged in their construction so as to be capable of withstanding the excessive strains and stresses attendant to such high velocities and accelerations.

An important object of the present invention is to provide an accelerometer that is extremely rugged in its construction and which is capable of withstanding extremely high extraneous forces. The improved construction of the accelerometer of the invention renders it ideal for the purposes outlined in the preceding paragraph, and the invention is capable of precise operations under such conditions of high velocities and accelerations.

In most types of accelerometers, it is usual to mount a resiliently biased mass in a housing in such a manner that the mass may be considered as "floating" with respect to the housing. The force producing the acceleration to be measured then causes the mass to move with respect to the housing. It was the general practice in the prior art units to affix a movable electrical contact wiper to the movable mass, the wiper being in sliding electrical engagement with a potentiometer resistance winding. As the mass moved in response to the acceleration forces, the wiper was also moved back and forth across the potentiometer winding. This movement of the wiper produced variations in a direct current voltage established across the potentiometer so as to provide electrical indications of the movements of the mass within the housing.

Accelerometers of the type described above have been used successfully for many years and have proved to be generally satisfactory in operation. However, there is a problem of wear as the wiper is moved back and forth over the potentiometer winding and of other sliding and rotating parts in the unit. One feature of the present invention is the provision of an accelerometer in which there are no sliding, rubbing, or rotating parts. This enables wear to be reduced to a minimum, and the instrument of the invention is capable of long and trouble-free service life.

The accelerometer of the present invention produces an alternating voltage across its output terminals, and the value of this alternating voltage varies as the mass resiliently supported within the instrument moves in response to acceleration forces. The value of the alternating voltage is a precise measurement of the accelerations involved.

An advantage in the use of alternating voltages in the instrument of the present invention, as compared with direct current voltages used in most the prior art instruments is that such alternating voltages may be directly applied to many automatic control devices used in aircraft and the like. For example, the automatic pilot mechanisms of most present-day aircraft utilize alternating control voltages. Therefore, the accelerometer of the present invention may be directly coupled to such mechanisms. In addition, and as will be fully described, it is the use of alternating voltages that enables the variable output voltage to be produced without the need for potentiometers with rubbing wipers, or similar devices which are subject to wear.

The accelerometer of the invention is constructed to be capable of simple adjustment so that the mechanical null point of the movable mass supported in the instrument may coincide with the electrical null point of the instrument itself. Such adjustment provides that all mechanical motion of the movable mass on one side of the mechanical null point will provide an output voltage of a particular phase, and all mechanical motion of the movable mass on the opposite side of the mechanical null point will provide an output voltage of the opposite phase. This allows for a precise calibration of the output voltage in terms of acceleration, and it also allows for the full use of the voltage range of the instrument.

The accelerometer of the invention is constructed to have a transformer with primary and secondary windings associated with first and second magnetic circuits. The movable mass of the instrument incorporates a pair of magnetic core members which move with respect to the first and second magnetic circuits and which are respectively included in the first and second magnetic circuits. The transformer has a pair of secondary windings which are connected in a differential manner so that the alternating output voltage resulting from an applied alternating input voltage is normally zero.

The motion of the movable mass of the instrument in one direction causes one of the cores incorporated in it to increase the reluctance of one of the magnetic circuits, and causes the other core incorporated in it to decrease the reluctance of the other magnetic circuit. In like manner, motion of the movable mass in the opposite direction causes the first core to decrease the reluctance of the first magnetic circuit and the second core to increase the reluctance of the other magnetic circuit. This action causes an output voltage to be developed by the instrument, this voltage having a first or second phase depending upon the direction of movement of the movable mass.

The magnetic core members referred to in the preceding paragraphs each have a generally rectangular shape in the embodiment of the invention to be described. These cores are spaced axially along a supporting shaft and are inclined to one another. In accordance with one concept of the invention, a third core member is interposed between the first two core members on the supporting shaft. This third core member is inclined with respect to each of the first two, and it serves to bridge the effect of the first two cores so as to provide a smooth variation in the output voltage throughout the full range of the instrument and to enable the mechanical null of the instrument to be adjusted so that it coincides with the electrical null.

When accelerometers are used for sensing shock loads and low frequency vibrations, and when the acceleration forces are not unduly large, a relatively large movable mass must be used, if precise measurements are to be obtained, and a suitable damping means for the mass is essential so that spurious oscillations may be damped out. Improved and efficient damping in the described unit of the invention is obtained by the provision of a permanent magnet within the instrument housing and by mounting a metallic member on the shaft which supports the movable mass. The metallic member moves in the field of the permanent magnet, and it produces a drag on the shaft which effectively damps undesired oscillatory motion of the movable mass.

Other features and advantages of the invention will be apparent from the following detailed description when considered in conjunction with the accompanying drawings in which:

Figure 1 is a top plan view of one embodiment of the improved accelerometer of the present invention, the accelerometer being shown as mounted in a suitable housing which is shown in section, and this view particularly illustrating threadable mounted parts of the instrument and slots in the accelerometer body which permit convenient adjustments to be made, as will be described;

Figure 2 is a side elevational view of the embodiment of the invention with the housing and supporting legs being shown partially in section, and this view shows particularly the means by which the accelerometer body itself is secured to its enclosing housing;

Figure 3 is an end view of the unit substantially on the line 3—3 of Figure 2 and partially broken away to reveal a disc-like resilient supporting member which supports a movable shaft for resilient longitudinal movement but which rigidly holds the shaft against radial movement;

Figure 8 is a somewhat schematic sectional representation of the accelerometer of the invention to illustrate the magnetic circuits in the unit and to show the corresponding electrical windings; and Figure 9 is an electrical circuit diagram of the electrical connections of the transformers included in the accelerometer illustrated in the preceding figures.

Figure 4:
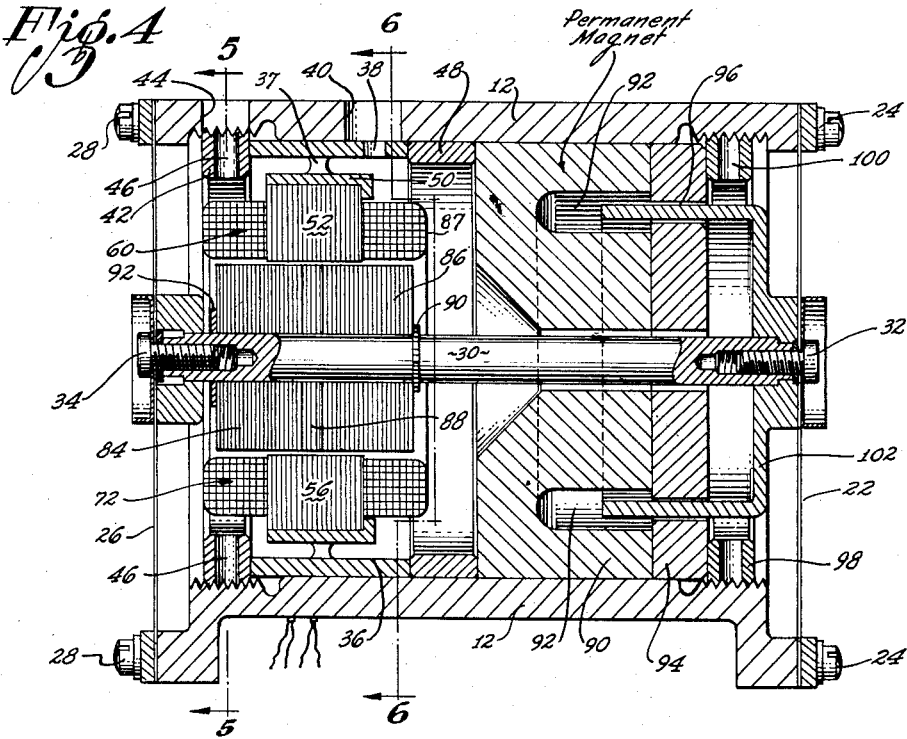
Figure 4 is a sectional view of the unit substantially on the line 4—4 of Figure 3, and this latter view particularly shows the movable mass of the unit resiliently supported on a movable shaft and electrical winding means associated with the movable mass, and this view also shows a permanent magnet damping mechanism for the movable mass.
Figure 5:
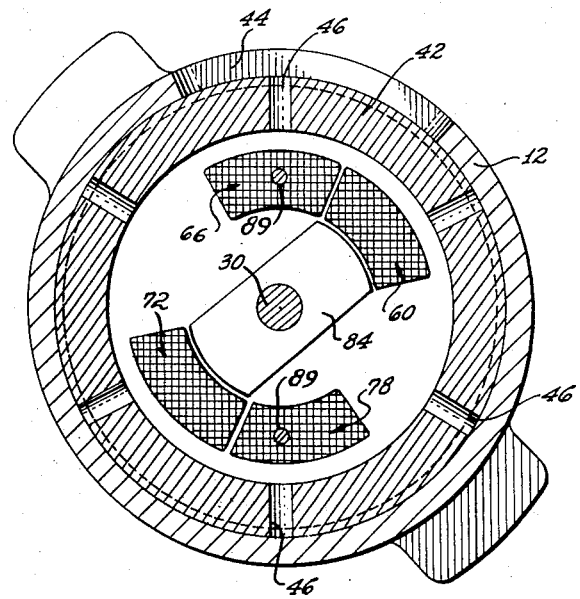
Figure 5 is a sectional view, substantially on the line 5—5 of Figure 4, particularly illustrating the threaded axially adjustable supporting bushing for certain internal components of the instrument; and this view also shows various windings of the unit and a movable core member which is included in the magnetic circuit of certain ones of these windings.

The illustrated embodiment of the invention includes an outer metallic housing 10 which completely surrounds the instrument. The outer housing may be appropriately mounted in an aircraft, or other vehicle whose acceleration forces are to be measured, by any known means. The accelerometer instrument itself includes an open-ended cylindrical body 12. The body 12 has four integral legs 14 which appear in Figures 2 and 3. These legs 14 are respectively supported on bosses 16, the bosses being formed integrally with a base 18 and which base forms part of the housing 10. The accelerometer is securely held on the bosses 18 by a series of screws such as the screw 20 (Figure 2). These screws are inserted in corresponding recesses in the bottom of the base 18, and they extend through respective ones of the bosses 16 into threaded engagement with the legs 14 of the body portion 12. In this manner, the body portion 12 is rigidly and securely mounted in the housing 10.

A first disc-like resilient member 22 is mounted at one end of the body portion 12 by means of a plurality of screws such as the screws 24. The disc-like resilient member 22 encloses the open end of the body portion 12, and it may be composed of a resilient metal such as beryllium copper. A second disc-like resilient member 26 is mounted at the other end of the open-ended body portion 12, and it encloses that end. The resilient member 26 is attached to the body portion 12 by means of a plurality of screws 28, and it too may be composed of beryllium copper. As shown in Figure 3, the disc-like resilient members 22 and 26 each have a plurality of arcuate slots formed in it to increase its axial resilience. The slots at different radiuses are alternately staggered and such alternate positioning of the slots, as illustrated, serves to produce uniform radial stiffness.

An axially movable shaft 30 extends between the resilient members 22 and 26 along the central longitudinal axis of the body portion 12. One end of the shaft 30 is secured to the center of the member 22 by means of a screw 32, the screw extending through an aperture in the member 22 into threaded engagement with the shaft 30. The other end of the shaft 30 is secured to the center of the resilient member 26 by means of a screw 34, which screw extends through an aperture in the member 26 into threaded relation with the shaft 30. The shaft 30 is therefore resiliently supported by the resilient members 22 and 26 for reciprocal, rectilinear motion along the central longitudinal axis of the body portion 12. This shaft, however, is rigidly supported by the resilient members 22 and 26 against any motion in a radial direction.

A tubular retainer 36 is positioned within the body portion 12 adjacent its left-hand end as shown in Figure 4. This tubular retainer 36 has an external diameter corresponding substantially to the internal diameter of the body portion 12. A series of radial apertures 38 are formed at equi-spaced angular positions in the retainer 36. An arcuate slot 40 is formed in the body portion 12 in radial alignment with the apertures 38 so that the apertures may be accessible from outside the body portion. In this manner, the retainer 36 may be rotated and shifted axially with respect to the body portion 12, and this may be achieved by means of a suitable tool which is inserted into successive ones of the apertures 38.

A bushing 42 is threaded to the internal surface of the body portion 12 at the left hand end of the body portion in Figure 4 and adjacent the resilient disc-like member 26. The bushing 42 is accessible through an arcuate slot 44 in the body portion, and the bushing has a series of radial apertures 46 at spaced angular positions which, like the apertures 38 in the retainer 36, may receive an appropriate adjustment tool. In this way, the bushing 42 may be rotated in its threads and moved axially along the internal peripheral surface of the body portion 12. The bushing 42 is positioned adjacent the left hand end of the retainer 36 in Figure 6, and this bushing assists in maintaining the retainer 36 within the body portion 12. It is apparent that the rotation of the threaded bushing 42 serves to adjust the axial position of the retainer 36 within the body portion 12.

The assembly also includes a tubular spacer member 48 having an external diameter corresponding to the inner diameter of the body portion 12. The spacer 48 is positioned adjacent the right-hand end of the retainer 36 in Figure 4, and it serves to separate the retainer from certain damping elements of the instrument which will be described.

The retainer 36 itself supports an annular magnetic core member 50 and this core member, in turn, supports a plurality of radial magnetic pole members, a necked spacer 37 being positioned between the core member 50 and the retainer 36. These radial pole members are best shown in the schematic diagram of Figure 8. As shown in that figure, the assembly includes a first pair of diametrically opposite radial pole members 52 and 56, and it includes a second pair of diametrically opposite pole members 54 and 58. A first stator transformer is supported on the pole member 52, and this transformer is indicated in Figure 4 generally as 60. The transformer 60 includes, as shown in Figure 8, a primary winding 62 and a secondary winding 64 which are wound in inductively coupled relation. In like manner, a second stator transformer 66 is supported on the pole member 54, and the transformer 66 includes a primary winding 68 and an inductively coupled secondary winding 70.

A stator transformer 72 is associated with the pole member 56, and the transformer 72 includes a primary winding 74 and a secondary winding 76 in mutual inductive relation. In like manner, the pole member 58 has a stator transformer 78 associated with it, and the transformer 78 includes a primary winding 80 with an inductively coupled secondary winding 82.

A series of laminated magnetic core members 84, 86 and 88 are positioned on the shaft 30 in substantial axial alignment with the pole members 52, 54, 56 and 58. The core members, as well as the pole members, may for example, be composed of silicon steel. The laminated cores are securely held on the shaft by a pair of annular collars 90 and 92. The annular collars are mounted on the shaft at the opposite sides of the cores, and the collars are secured to the shaft 30 in any appropriate manner so that the core members may be rigidly held on the shaft.

Figure 6:
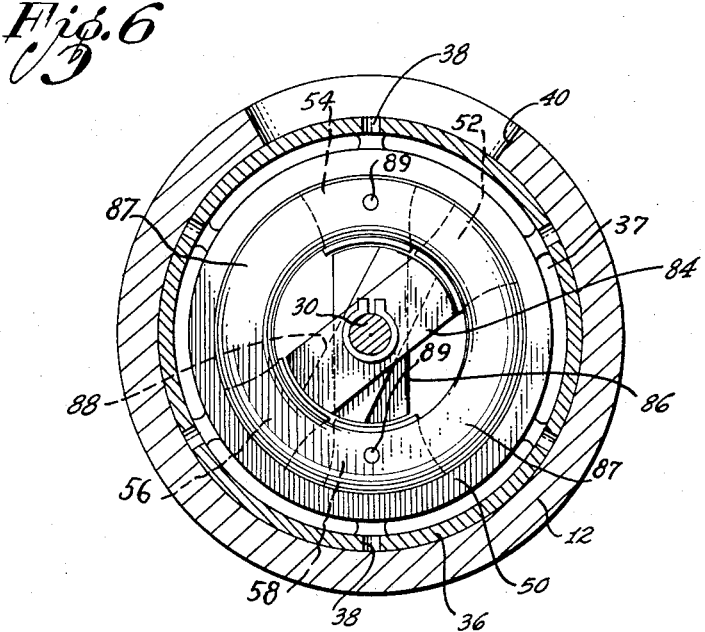
Figure 6 is a sectional view substantially on the line 6—6 of Figure 4 and particularly illustrating the magnetic core members incorporated in the movable mass of the instrument and included in the magnetic circuits of the various windings of the instrument.
Figure 7:
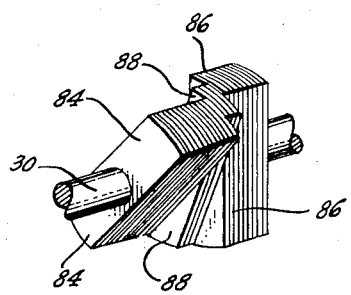
Figure 7 is a perspective view of the magnetic core members used in the accelerometer of the invention, which core members control the effective inductance of the windings in the unit in a manner to be described.

The core member 84 has a generally rectangular configuration, and it is supported on the shaft 30 in angular alignment with the pole members 52 and 56 (Figure 6). The core member 84 defines air gaps with each of these pole members. The core member 86 is inclined to the core member 84, and it is positioned on the shaft 30 in radial alignment with the pole members 54 and 58 (Figure 6). The core member 84 defines air gaps with each of the pole members 54 and 58. The core member 88 is interposed, between the core members 84 and 86 and is inclined to each of these core members as shown in Figures 6 and 7. An annular shield 87 is positioned adjacent the windings 66, 72 and 78 at the right hand end of the windings in Figure 4. As shown in Figure 6, this shield is supported by a plurality of pins 89 which extend through the shield 87 and into the coils 66 and 78 and their associated cores 54 and 58.

The arrangement is such that when the shaft 30 is at its mechanical null point, substantially 50% of the core 84 is in axial alignment with the pole members 52 and 56 and included in the magnetic circuit between these pole members. The core member 84 forms air gaps with these pole members, and as the shaft 30 moves axially, more or less of the core member 84 is brought into the magnetic circuit of the pole members 52 and 56. This controls the reluctance of the magnetic circuit and thereby controls the effective inductance of the windings of the transformers 60 and 72 associated with these pole members.

In like manner, the core member 86 has one half of its effective width in axial alignment with the pole members 54 and 58 when the assembly is at its mechanical null point. Then, as the shaft 30 moves axially, the core 86 moves to bring more or less of its width into the magnetic circuit thereby to increase or decrease the reluctance of the magnetic circuit effectively to vary the inductance of the windings of the transformers 66 and 78.

It will be noted that the core member 84 moves to decrease the reluctance of its magnetic circuit and the core 86 moves to increase the reluctance of its magnetic circuit as the shaft 30 moves to the right in Figure 4. Alternately, the core 84 moves to increase the reluctance of its magnetic circuit and the core 86 moves to decrease the reluctance of its magnetic circuit as the shaft 30 moves to the left in Figure 4.

A permanent magnet 90 of disc-like configuration is mounted in the body portion 12. The permanent magnet may, for example, be composed of a suitable permanent magnet substance such as "alnico 5." The external diameter of the permanent magnet corresponds to the internal diameter of the body portion 12, and the permanent magnet is axially positioned within the body portion adjacent the spacer 48. The permanent magnet 90 has a central aperture through which the shaft 30 extends and it also has an annular slot or groove 92 formed in one of its surfaces. A pole piece 94 of disc-like configuration is positioned within the body portion 12 adjacent the external surface of the permanent magnet 90. The pole piece 94 has an annular slot 96 in axial alignment with the slot 92, and the two portions of the pole piece are secured to the outer face of the permanent magnet 90 by any appropriate means (not shown).

A second bushing member 98 is mounted in threaded engagement with the internal surface of the body portion 12 at the end thereof adjacent the disc-like resilient member 22. The bushing 98 has a series of apertures 100 extending through it, and these apertures are accessible through an arcuate slot 102 in the body portion 12.

It is evident, therefore, that the bushing members 42 and 98 serve to maintain the retainer 60 and the permanent magnet 90 within the body portion 12. Also, these bushings can be adjusted through the respective slots 44 and 102 in the body portion 12 to shift the axial position of the retainer 36. This axial position of the retainer 36 may be shifted so that the pole members 52, 54, 56, 58 are shifted axially with respect to the core members 84, 86 and 88 until the mechanical null point of the assembly corresponds with the electrical null point. This adjustment, as noted above, enables full use of the voltage range of the instrument, and also enables a precise calibration to be achieved. It has been found that the interposition of the core member 88 between the cores 84 and 86, with its illustrated inclination to each of the cores 84 and 86, permits such an adjustment to be made so that the mechanical and electrical null points of the apparatus may coincide.

A cup-shaped metallic member 102 is mounted on the end of the shaft 30 remote from the core members 84, 86 and 88. The cup-shaped metallic member has a generally cylindrical configuration with its open end facing inwardly. The member 102 extends through the slot 96 in the pole piece 94 and into the annular slot 92 in the permanent magnet 90.

The cup-shaped metallic member 102 may be composed of copper or brass, and it moves with the shaft 30 in the magnetic field of the permanent magnet 92 and its pole piece 96. Such movement of the metallic member sets up eddy currents in the member, and these eddy currents develop magnetic fields which oppose the magnetic field produced by the permanent magnet 90. The metallic member, therefore, functions as a drag for the shaft 30 and quickly damps out undesired oscillations of the shaft after movements in response to acceleration forces. As noted earlier, this damping system is especially required when the accelerometer is used with a large movable mass for sensing relatively small shock loads and relatively low frequency vibrations. The instrument is also preferably filled with oil to assist in the damping of its movable mass.

As best shown in Figure 9, the primary winding 62 of the transformer 60 is connected in series with a primary winding 74 of the transformer 72. In like manner, the secondary winding 64 of the transformer 60 is connected in series with the secondary winding 76 of the transformer 72. Also, the primary winding 68 of the transformer 66 is connected in series with the primary winding 80 of the transformer 78, and the secondary winding 70 of the transformer 66 is connected in series with the secondary winding 82 of the transformer 80. Then, the two series-connected primary windings 62 and 74 are connected in series with the two series-connected primary windings 68 and 80 across a pair of input terminals 110. Also, the series-connected secondary windings 64 and 76 and the series-connected secondary windings 70 and 82 are connected in series between a pair of output terminals 112. The magnetic circuit between the primary windings 62, 74 and the secondary windings 64, 76 is indicated schematically at 114. This magnetic circuit, as described above, is made up of the magnetic pole members 52 and 56 and by the magnetic core member 84. The magnetic circuit between the primary windings 68, 80 and the secondary windings 70, 82 is indicated schematically at 116. This latter magnetic circuit, as described above, is made up of the magnetic pole members 54 and 58 and by the magnetic core member 86.

The windings illustrated in Figure 9 are connected in a differential manner so that no output voltage is developed across the terminals 112 in response to an alternating input voltage applied across the input terminals 110 so long as the reluctance in the magnetic circuits 114 and 116 are equal. However, as the shaft 30 moves to increase the reluctance in one magnetic circuit and to decrease the reluctance in the other, and vice versa, a varying output voltage appears across the output terminals 112. In a constructed embodiment of the invention, the input alternating voltage had a value of from 110 volts–115 volts and frequencies within the range of 400 cycles–5000 cycles were used.

The windings of Figure 9 are so connected that when the shaft moves in one direction in response to an acceleration force, the alternating voltage which appears across the output terminals 112 has a selected phase with respect to the input alternating voltage. Then, when the shaft moves in the opposite direction, the resulting alternating voltage across the output terminals 112 has a reversed phase with respect to the output voltage in the first instance. The output voltage appearing across the output terminals of the instrument, therefore, has a phase indicative of the direction of the accelartion force, and it has an amplitude indicative of the value of that force.

The invention provides, therefore, a relatively simple instrument of the accelerometer type. In the manner described, the instrument does not use any rotatable or slidable parts. This enables wear to be reduced to a minimum, and the instrument is capable of a long and trouble-free life. Also, the accelerometer of the invention is capable of developing an output voltage which is a precise measurement of the value and direction of the acceleration force to be measured by the instrument.

We claim:

1. In an accelerometer, the combination of an open-ended cylindrical-shaped body portion, a first disc-like resilient member mounted at one end of said body portion and extending across such one end, a second disc-like resilient member mounted at the other end of said body portion and extending across such other end, a shaft secured to said first and second disc-like members and supported thereby for reciprocal rectilinear motion with respect to said body portion along the central longitudinal axis of said body portion, first and second magnetic pole members supported on the internal surface of said body portion in angularly displaced relation and extending substantially radially with respect to the central longitudinal axis of said body portion, first and second winding means respectively supported by said first and second pole members, a first magnetic core member carried by said shaft and movable across the face of said first pole member to vary the reluctance of the magnetic circuit of said first winding means, and a second magnetic core member carried by said shaft and movable across the face of said second pole member to vary the reluctance of the magnetic circuit of said second winding means in the opposite sense to the variation of the reluctance of the magnetic circuit of said first winding means by said first core member.

2. In an accelerometer, the combination of an open-ended cylindrical-shaped body portion, a first disc-like resilient member mounted at one end of said body portion and extending across such one end, a second disc-like resilient member mounted at the other end of said body portion and extending across such other end, a shaft secured to said first and second disc-like members and supported thereby for reciprocal rectilinear motion with respect to said body portion along the central longitudinal axis of said body portion, first and second magnetic pole members supported on the internal surface of said body portion in angularly displaced relation and extending substantially radially with respect to the central longitudinal axis of said body portion, a first transformer including primary and secondary windings supported on said first pole member, a second transformer including primary and secondary windings supported on said second pole member, and first and second transformers being connected in differential relation, a first magnetic core member carried by said shaft and extending radially across said body portion in angular alignment with said first pole member and movable across the face of said first pole member to vary the reluctance of the magnetic circuit of said first transformer, and a second magnetic core member carried by said shaft spaced axially from said first core member and extending radially across said body portion in angular alignment with said second pole member and movable across the face of said second pole member to vary the reluctance of the magnetic circuit of said second transformer, said second core member varying the reluctance of said last-mentioned magnetic circuit in the opposite sense to the variation of the reluctance of the first-mentioned magnetic circuit by said first core member.

3. The combination defined in claim 2 which includes a third magnetic core member mounted on said shaft between said first and second core members and inclined with respect to each of said first and second core members.

4. In an accelerometer, the combination of, a housing, a member resiliently supported in said housing for reciprocal rectilinear motion with respect to said housing, first and second magnetic pole members supported in said housing in angularly displaced relation and extending substantially radially with respect to said resiliently supported member, first and second winding means respectively supported by said first and second pole members, a first magnetic core member carried by said resiliently supported member and movable across the face of said first pole member to vary the reluctance of the magnetic circuit of said first winding means, a second magnetic core member carried by said resiliently supported member inclined to and spaced axially from said first core member, said second core member being movable across the face of said second pole member to vary the reluctance of the magnetic circuit of said second winding means, and a third magnetic core member mounted on said resiliently supported member and interposed between said first and second core members, said third core member being inclined with respect to each of said first and second core members.

5. In an accelerometer, a combination of, a housing, a member resiliently supported in said housing for reciprocal rectilinear motion with respect to said housing, a first pair of diametrically opposite magnetic pole members supported in said housing and extending substantially radially with respect to said resiliently supported member, a second pair of diametrically opposite magnetic pole members supported in said housing in angularly displaced relation with said first pair of pole members and extending substantially radially with respect to said resiliently supported member, first and second electrical winding means respectively supported by said first and second pairs of pole members, a first magnetic core member carried by said resiliently supported member in angular alignment with said first pair of pole members and movable with respect thereto to vary the reluctance of the magnetic circuit of said first winding means, and a second magnetic core member carried by said resiliently supported member in angular alignment with said second pair of pole members and spaced axially from said first core member, said second core member being movable with respect to said second pair of pole members to vary the reluctance of the magnetic circuit of said second winding means.

6. In an accelerometer, the combination of, a housing, a member resiliently supported in said housing for reciprocal rectilinear movement with respect to said housing, a first pair of diametrically opposite magnetic pole members supported in said housing and extending substantially radially with respect to said resiliently supported member, a second pair of diametrically opposite magnetic pole members supported in said housing in angularly displaced relation with said first pair of pole members and extending substantially radially with respect to said resiliently supported member, first and second electrical winding means respectively supported by said first and second pairs of pole members, a first elongated rectangular magnetic core member carried by said resiliently supported member and extending radially in angular alignment with said first pair of pole members and movable with respect thereto to vary the reluctance of the magnetic circuit of said first winding means, a second elongated rectangular magnetic core member carried by said resiliently supported member and extending radially in angular alignment with said second pair of pole members and spaced axially from said first core member, said second core member being movable with respect to said second pair of pole members to vary the reluctance of the magnetic circuit of said second winding means, and a third elongated rectangular magnetic core member carried by said resiliently supported member interposed between said first and second core members and extending radially at an inclination to each of said first and second core members.

7. In an accelerometer, the combination of, a housing, a member resiliently supported in said housing for reciprocal rectilinear movement with respect to said housing, a first pair of diametrically opposite magnetic pole members supported in said housing and extending substantially radially with respect to said resiliently supported member, a second pair of diametrically opposite magnetic pole members supported in said housing in angularly displaced relation with said first pair of pole members and extending substantially radially with respect to said resiliently supported member, first and second primary windings respectively supported on individual ones of said first pair of pole members, first and second secondary windings respectively supported on individual ones of said first pair of pole members, third and fourth primary windings respectively supported on individual ones of said second pair of pole members, third and fourth secondary windings respectively supported on individual ones of said second pair of pole members, said windings on said first pair of pole members being electrically connected to said windings on said second pair of pole members in differential manner, a first elongated rectangular magnetic core member carried by said resiliently supported member extending in angular alignment with said first pair of pole members and movable with respect thereto to vary the reluctance of the magnetic circuit of the windings on said first pair of pole members, a second elongated rectangular magnetic core member carried by said resiliently supported member and extending radially in angular alignment with said second pair of pole members and spaced aixally from said first core member, said second core member being movable with respect to said second pair of pole members to vary the reluctance of the magnetic circuit of said windings on said second pair of pole members.

References Cited in the file of this patent

UNITED STATES PATENTS

| | | |
|---|---|---|
| 2,311,079 | Parr | Feb. 16, 1943 |
| 2,440,605 | Hathaway | Apr. 27, 1948 |
| 2,552,722 | King | May 15, 1951 |
| 2,656,519 | Sheppard | Oct. 20, 1953 |